United States Patent
Wooters et al.

(10) Patent No.: US 8,452,654 B1
(45) Date of Patent: May 28, 2013

(54) SYSTEM AND METHOD FOR ISSUING REWARDS TO CARD HOLDERS

(75) Inventors: D. Stephen Wooters, Woodbridge, CT (US); David W. Power, Milford, CT (US)

(73) Assignee: RBS NB, Bridgeport, CT (US)

( * ) Notice: Subject to any disclaimer, the term of this patent is extended or adjusted under 35 U.S.C. 154(b) by 2436 days.

(21) Appl. No.: 11/154,779

(22) Filed: Jun. 16, 2005

(51) Int. Cl.
*G06Q 30/00* (2006.01)
*G06Q 30/02* (2006.01)

(52) U.S. Cl.
CPC ................................ *G06Q 30/0234* (2013.01)
USPC .................................................... 705/14.34

(58) Field of Classification Search
USPC ................. 705/14, 26, 17, 21, 39, 35, 10, 44, 705/38; 235/375, 380, 381, 492
See application file for complete search history.

(56) References Cited

U.S. PATENT DOCUMENTS

| | | | | |
|---|---|---|---|---|
| 5,559,313 A | * | 9/1996 | Claus et al. | 705/30 |
| 5,774,870 A | * | 6/1998 | Storey | 705/14 |
| 5,832,457 A | * | 11/1998 | O'Brien et al. | 705/14 |
| 6,009,412 A | * | 12/1999 | Storey | 705/14 |
| 6,018,718 A | * | 1/2000 | Walker et al. | 705/14 |
| 6,594,640 B1 | * | 7/2003 | Postrel | 705/14 |
| 6,985,879 B2 | * | 1/2006 | Walker et al. | 705/35 |
| 7,076,465 B1 | * | 7/2006 | Blagg et al. | 705/40 |
| 2002/0087410 A1 | * | 7/2002 | Walker et al. | 705/14 |
| 2002/0198803 A1 | | 12/2002 | Rowe | 705/35 |
| 2003/0061097 A1 | * | 3/2003 | Walker et al. | 705/14 |
| 2003/0120571 A1 | * | 6/2003 | Blagg | 705/35 |
| 2004/0068438 A1 | | 4/2004 | Mitchell et al. | 705/14 |
| 2004/0122736 A1 | * | 6/2004 | Strock et al. | 705/14 |
| 2004/0254835 A1 | * | 12/2004 | Thomas et al. | 705/14 |
| 2006/0173739 A1 | * | 8/2006 | Heywood | 705/14 |

* cited by examiner

*Primary Examiner* — Rutao Wu
*Assistant Examiner* — Krishan Mittal
(74) *Attorney, Agent, or Firm* — DLA Piper LLP (US)

(57) ABSTRACT

A system and method for issuing variable level rewards to card holders according to expenditures in transaction categories. Card transactions for a specified period of time are classified by codes and are assigned to one of several transaction categories such as entertainment, travel, dining, sporting goods, and electronics. A total amount of expenditures for each transaction category is determined. The transaction category with the largest value of expenditures is determined. The highest available reward is applied to the total amount of expenditures in the transaction category that has the largest value of expenditures. Consumers may take advantage of a high level or more valuable reward in a multi-level reward structure regardless of their spending habits or patterns because the more valuable reward is applied to the expenditures in the largest expenditure transaction category.

14 Claims, 2 Drawing Sheets

SYSTEM AND METHOD FOR ISSUING REWARDS TO CARD HOLDERS

FIELD OF THE INVENTION

The present invention relates to the field of consumer spending incentive programs based on card purchases. Specifically, the present invention relates to issuing variable level rewards to card holders according expenditures within a transaction category. In particular, transactions for a relevant transaction period are assigned to transaction categories and a higher level reward is applied to the expenditures in the transaction category for which the expenditures are largest.

BACKGROUND OF THE INVENTION

Consumers who use financial cards for purchases benefit from a variety of incentive programs that are offered by the financial institutions that issue the cards. Incentives include rebates, cash rewards, coupons, gift certificates, merchandise, or any type of instrument that a consumer may use to make additional purchases. Because consumers are familiar with many types of incentive programs and have many options when selecting a financial card, financial institutions often compete for new customers based on their incentive programs. Attractive incentive programs with substantial benefits entice new consumers and may increase the likelihood that a consumer will continue using a particular financial card rather than switch to a competing product.

A common incentive program is to issue a reward or rebate based on total spending for all of the consumer's card purchases. For example, a consumer may receive a 2% cash-back reward based on the total amount of purchases made in a year. The disadvantage of such total-spending based programs is that same rebate or reward applies regardless of how or where the consumer spends money. Consumers are not rewarded for making any particular type of purchase. Furthermore, there is no additional or higher level award that is available to consumers.

Some companies have attempted to provide consumers with incentives to make certain types of purchases by rewarding purchases of a particular vendor's product. For example, a consumer holding a branded gas credit card may receive a reward or rebate in relation to his or her gasoline purchases of the applicable brand. The disadvantage of such a program is that the reward or rebate applies to only one type and brand of product. There is no reward (or only a lower level or reduced reward) for other types of purchases. Furthermore, if more than one reward level is offered, the higher level reward is available only on applicable brand purchases that may represent a small fraction of the consumer's total purchases. The consumer's ability to take advantage of the higher level reward is very limited.

Still other programs require consumers to spend a certain amount of money before any rebate or reward is issued. In some instances, a rebate or reward is issued to all consumers that reach a threshold spending limit within a one year period. Some programs may issue rewards or rebates or according to a "tier" structure so that consumers are rewarded differently in relation to their spending levels and types of purchases. Each tier may require a consumer to spend a certain amount of money on certain types of purchases within a certain period of time. Once a consumer's use of the account meets all of the specified conditions, including the spending limit, a reward or rebate is issued. Higher level rewards apply to the higher spending limits. For example, a higher percentage cash-back reward may be applied to purchases above a certain threshold while a lower percentage cash-back reward is applied to purchases below the threshold.

In tiered structures, consumers that spend the most receive the most valuable rewards. For customers that do not reach the spending limit for the higher percentage cash-back reward, the value of the consumer's reward is reduced significantly because a lower percentage is applied to the lower spending amount to determine the value of the reward or rebate. The disadvantage of these types of programs is that a consumer's purchases must meet a number of conditions before a significant reward or rebate is issued. Consumers who purchases do not reach the specified spending levels are not permitted to participate in the incentive program in the same way that consumers who reach the specified spending levels are permitted to participate.

Current incentive programs are limited in a variety of ways and therefore, do not address the varied spending habits and patterns that consumers have. The requirements for receiving rebates or rewards are complex and often require consumers to meet spending limit and spending category conditions in order to receive a more valuable or higher level reward or rebate. Consumers that do not meet all of the conditions, especially the spending level limits, are effectively excluded from participation in the more valuable portion of the incentive program. Therefore, there is a need for an incentive program that allows all consumers to have access to more valuable rewards or rebates without reaching a specified spending level or spending with a specific category. There is also a need for an incentive program that maximizes the reward or rebate to the consumer by maximizing the purchase amount to which the higher level or more valuable reward is applied.

SUMMARY OF THE INVENTION

The present invention is a system and method for issuing variable level rewards to card holders according to expenditures in transaction categories. Card transactions for a specified period of time are classified by codes and are assigned to one of several transaction categories (e.g., entertainment, travel, dining, sporting goods, or electronics). A total amount of expenditures for each transaction category is determined. The total expenditures for each transaction category are compared to determine the transaction category with the largest value of expenditures. The highest available reward is then applied to the total amount of expenditures in the transaction category that is determined to have the largest value of expenditures. For example, if the largest value of expenditures in a given month is for travel, then a 3% cash back reward is applied to the value of the expenditures in the travel transaction category and a 1% reward is applied to the value of the expenditures in the remaining transaction categories. The category to which the highest level award is applied varies each month depending on the level of expenditures in each transaction category.

The present invention allows consumers to take advantage of a high level or more valuable reward in a multi-level reward structure regardless of their spending habits or patterns. The present invention examines expenditures in various transaction categories and maximizes the reward to the consumer by applying the more valuable reward to the expenditures in the largest expenditure transaction category.

DETAILED DESCRIPTION OF PREFERRED EMBODIMENTS

Figure 1:
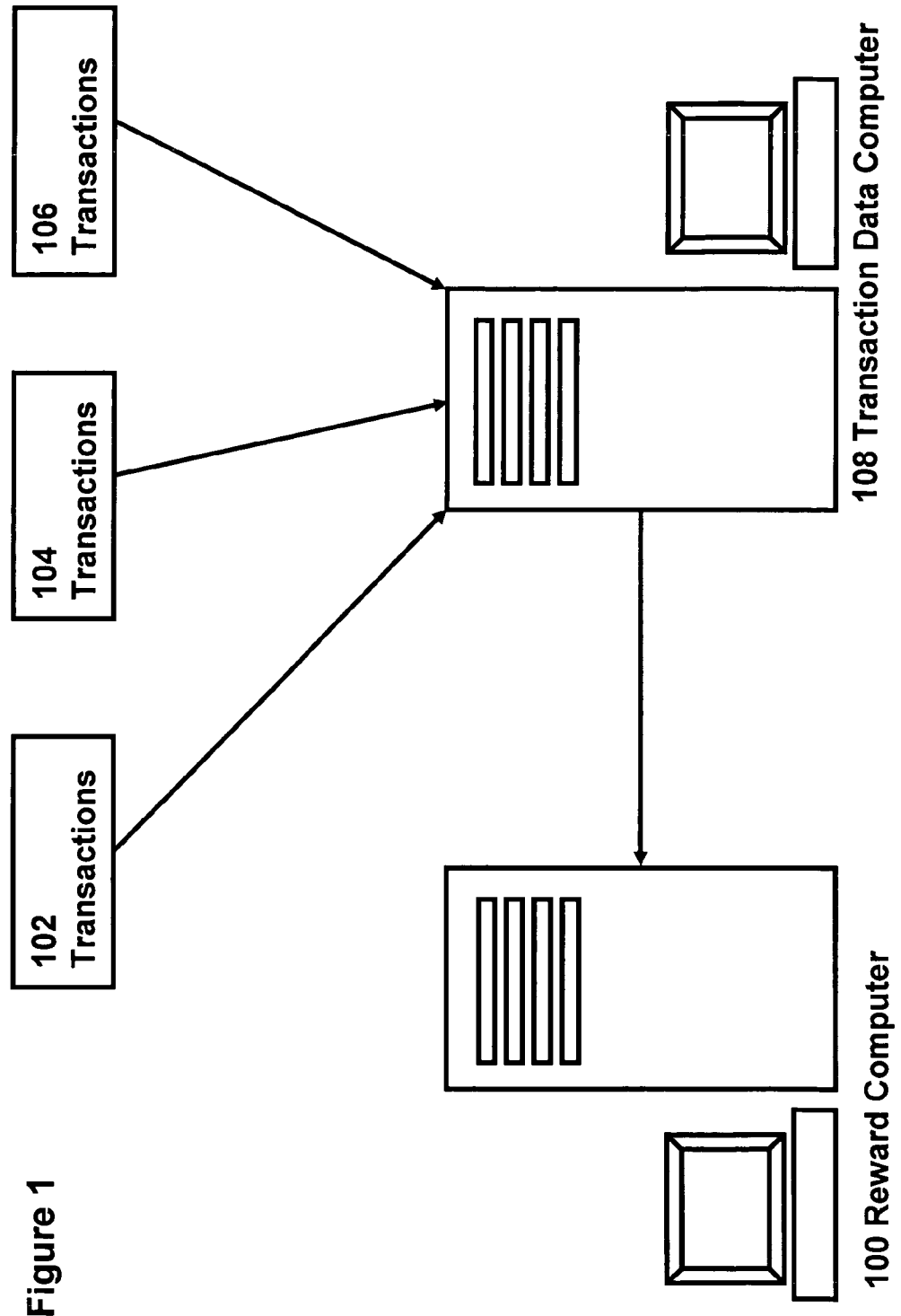
FIG. 1 is a system architecture diagram for an example embodiment of the present invention.

Referring to FIG. 1, a system architecture diagram for an example embodiment of the present invention is shown. As shown in FIG. 1, the present invention may be implemented on a computerized system executing appropriate application programs related to receiving card transaction data and analyzing card transactions to determine a reward for a card holder according to the present invention. Those of skill in the art will recognize that a system and method according to the present invention may be implemented using various combinations of computers and application programs for transfer and processing of card transaction data to determine a reward and that the architecture of FIG. 1 represents one such architecture for implementing the present invention.

As shown in FIG. 1, card transaction data may be received from a variety of sources 102, 104, 106 such as traditional retailers, online retailers, entertainment establishments, travel companies, etc. As card holders use their cards for purchases or transactions at the sources 102, 104, 106, transaction data for each purchase or transaction is recorded at the source. Transaction data from the various sources 102, 104, and 106 may then be transferred to a transaction data computer 108 operated by a financial institution or card issuer offering the card holder reward program of the present invention. Transaction data for a plurality of card holders may be received at the transaction data computer 108 where it is organized and stored in card holder accounts. Each card holder account may comprise identifying information such as name, address, telephone number, a social security number, an account number, a card transaction history, and a card reward history for rewards issued to the card holder in accordance with the present invention. For security reasons, various portions of card holder account information may be encrypted and/or stored separately in different computer systems. The reward program of the present invention may be applied to a variety of transaction or financial cards such as credit cards, charge cards, debit cards, smart cards, digital cards, bank or banking cards, commerce cards, or any type of electronic transaction or purchase card for which transaction data may be processed and stored.

The reward computer 100 is used to determine rewards for card holders according to the method of the present invention. The card issuer offering a card holder reward program according to the present invention may specify several parameters to be used by an application program operating at the reward computer to determine rewards for card holders. First, the card issuer selects a time interval or period for determining and issuing rewards. The reward determination for a card holder account may be made at any point in time but is typically completed at the end of a billing period, at the end of a plurality of billing periods, at the end of the calendar year, or at the end of the year according to the anniversary date of the card. Once the time period is selected, transactions that fall within the dates of the time period or transactional period may be analyzed to determine a reward.

Other information relevant to the determination of a reward includes transaction categories. The card issuer may decide to organize transactions into two or more categories. Categories may relate to types of purchases such as travel, food (e.g., including dining and groceries), electronics, entertainment, clothing, sporting goods, home maintenance, lawn and garden, appliances, pets, automotive, etc. Transaction data that is received at the transaction data computer 108 and reward computer 100 may have associated codes that may be used for the purpose of assigning transactions to categories. Alternatively, the application program at the reward computer 100 may assign transaction categories using transaction data such as the vendor providing the product or service to the card holder. As may be appreciated those of skill in the art, there are many categories to which transactions may be assigned and there are many ways to assign transactions to categories.

Finally, the card issuer determines appropriate reward levels for the various transaction categories. In an example embodiment of the present invention, two reward levels are applied to a card holder's expenditures. A higher reward level applies to the expenditures in the transaction category for which the card holder's expenditures were greatest. A lower reward level applies to all expenditures in all other categories. For example, a 3% cash-back reward may be applied to the total amount of expenditures in the transaction category for which the card holder's expenditures were greatest and a 1% cash-back reward may be applied to all other expenditures. In alternative embodiments of the present invention, additional reward levels may be applied to expenditures in various transaction categories. First, the total value of expenditures in each transaction category is determined. Then, the highest level reward is applied to the transaction category with the highest level expenditures, the second highest level reward is applied to the transaction category with the second highest level expenditures, the third highest level reward is applied to the transaction category with the third highest level expenditures, etc. The lowest level reward may be applied to total of the remaining expenditures.

Figure 2:
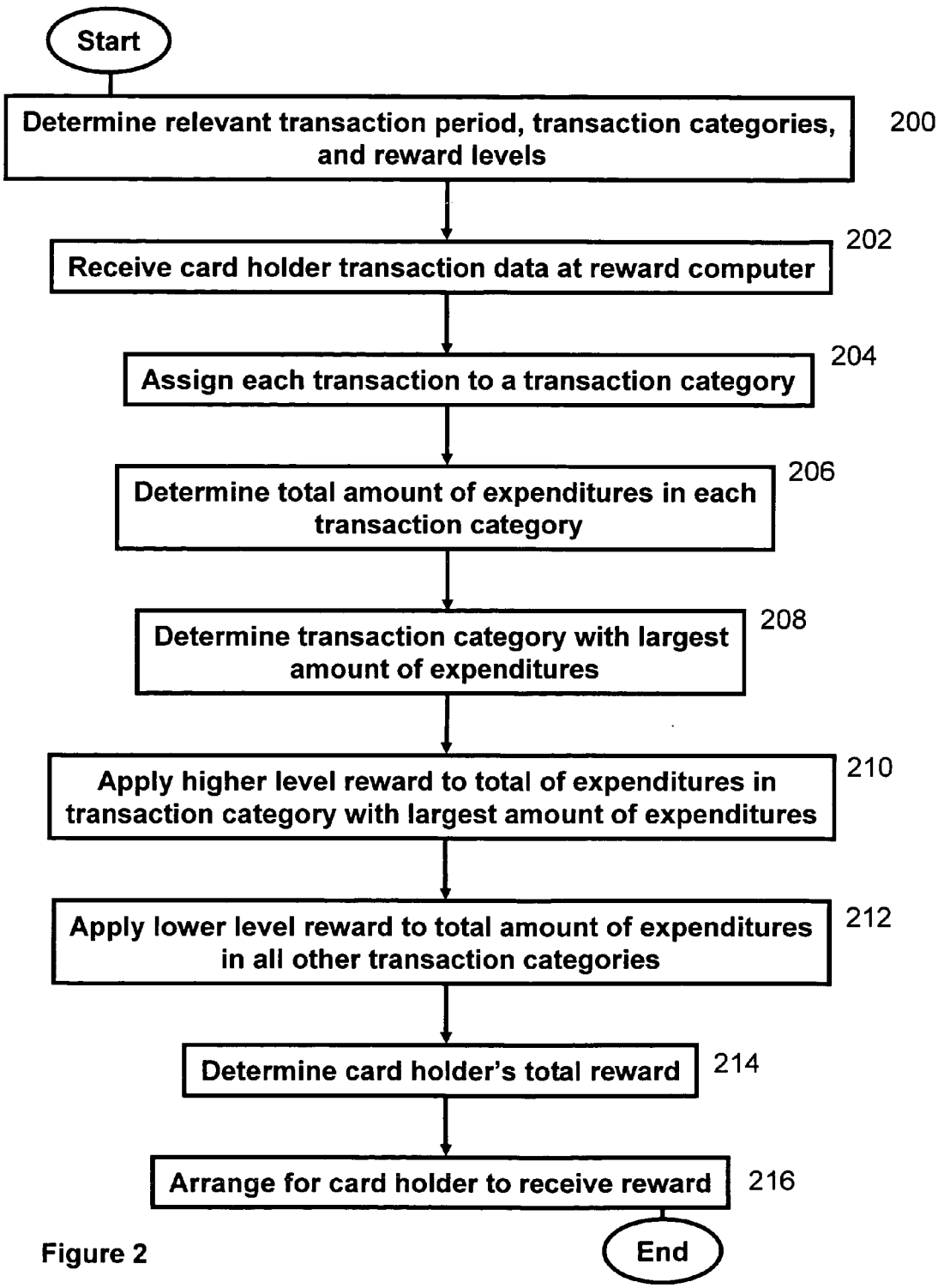
FIG. 2 is a flowchart of the primary steps for an example embodiment of the present invention.

Referring to FIG. 2, the primary steps for determining a reward according the present invention is shown. In the first step 200, a card issuer implementing a reward program according to the present invention determines the frequency with which rewards will be offered by choosing a relevant transaction period (e.g., a billing period, a plurality of billing periods, monthly, yearly, etc.), transaction categories to which transactions will be assigned (e.g., travel, dining, entertainment, sporting goods, electronics, etc.), and reward levels (e.g., 3% for highest level of expenditures in a transaction category, 1% for all others).

Next, in step 202, card holder transaction data is received at the reward computer so that rewards for card holders may be determined. Each transaction is assigned to a transaction category in step 204. If the transaction data that is received at the reward computer includes transaction codes, the associated transaction codes may be used to assign transactions to categories. Alternatively, vendor data or other data associated with the transactions, alone or in combination, may be used to assign transactions to categories. In step 206, the total amount of expenditures in each transaction category is determined. In step 208, the transaction category with largest amount of expenditures 208 is determined. In step 210, the higher or high-level reward is applied to the total of the expenditures in the transaction category with largest amount of expenditures 210 and in step 212, the lower or low-level reward is applied to the total of the expenditures in all other transaction categories. The card holder's total reward is determined in step 214 by adding the amounts determined in steps 210 and 212. Finally, arrangements are made for the card holder to receive the cash-back reward 216.

The following table further illustrates the calculation of a reward according to the method of the present invention.

TABLE 1

| Transaction Date | Vendor | Transaction Code | Amount |
|---|---|---|---|
| May 01, 2005 | ABC | 111 | $3,251.46 |
| May 02, 2005 | GHI | 111 | $302.11 |
| May 04, 2005 | ABC | 111 | $980.80 |
| May 08, 2005 | XYZ | 401 | $1,205.66 |
| May 09, 2005 | OPQ | 289 | $94.77 |
| May 12, 2005 | STU | 111 | $448.29 |
| May 14, 2005 | DEF | 903 | $55.34 |
| May 18, 2005 | OPQ | 435 | $77.60 |
| May 23, 2005 | MNO | 903 | $144.89 |
| May 31, 2005 | JKL | 903 | $87.56 |

In this example, Table 1 contains transaction data for a card holder for the month of May 2005. Transaction categories are determined according to the transaction codes as shown in column 3 of the table. Transaction code 111 may indicate purchases of electronics from various vendors for the installation of a home theater. The May 1, 2005 purchase from ABC for $3251.46 may be for a television. The May 2, 2005 purchase from GHI for $302.11 may be for a DVD player. The May 4, 2005 purchase from ABC for $980.80 may be for speakers for the home theater. Finally, the May 12, 2005 purchase from STU for $448.29 may be for a subwoofer for the home theater. Transaction code 903 may indicate purchases of groceries. Transaction codes 401, 289, and 435 may indicate other types of purchases such as airline tickets, dining, and gasoline respectively.

The following table shows the total expenditures for each category.

TABLE 2

| Transaction Code | Total Amount of Expenditures |
|---|---|
| 111 | $4,982.66 |
| 401 | $1,205.66 |
| 903 | $287.79 |
| 289 | $94.77 |
| 435 | $77.60 |

If rewards are issued monthly and two reward levels are applied to the expenditures (3% for highest level expenditures and 1% for all others), a reward according to the transaction data in Table 1 may be determined as follows. The electronics category (transaction 111) is the transaction category with largest amount of expenditures so the 3% reward is applied to the electronics category total of $4,982.66 for a reward of $149.48. The total of the expenditures in the remaining categories is $1,665.82 so the 1% reward is applied to the $1,665.82 for a reward of $16.66. Therefore, the total cash-back reward to the card holder is $166.14.

If additional reward levels are used (e.g., 3% for highest level expenditures, 2% for second highest level expenditures, and 1% for all others), a reward according to the transaction data in Table 1 may be determined as follows. The electronics category (transaction 111) is the transaction category with largest amount of expenditures so the 3% reward is applied to the electronics category total of $4,982.66 for a reward of $149.48. The total of the expenditures in the travel category (transaction code 401) is the transaction with the second largest amount of expenditures so the 2% reward is applied to the travel category total of $1,205.66 for a reward of $24.11. The total in the remaining categories is $1,665.82 so the 1% reward is applied to the $1,665.82 for a reward of $4.60. Therefore, the total cash-back reward to the card holder is $178.19.

As is apparent from the above example, the amount of a card holder's reward varies with the totals of expenditures in various transaction categories. Although example embodiments of the present invention have been explained in relation to cash-back rewards that are offered to card holders, any type of reward that is based on a percentage of a card holder's highest level of expenditures in various transaction categories may be issued. For example, a gift certificate, rebates, or coupon may be issued instead of a cash-back reward.

In the present invention, transaction categories are used to determine a card holder's largest expenditures so that a higher reward level may be applied to those expenditures. It is not necessary for a card holder to make purchases in any particular transaction category in order to take advantage of a higher reward level. They are also not required to spend a certain amount on particular products for a higher level reward is applied. With the present invention, a card holder may be "rewarded" for purchasing a home theater in one month, for taking a family vacation the next month, and for purchasing a new computer the following month. Card holders are rewarded for expenditures in relation to their individual spending habits and patterns.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A variable level reward system comprising:
   a transaction data computer for:
   (a) receiving from a plurality of sources financial card transaction data for a plurality of card holders;
   (b) organizing said financial card transaction data according to card holder accounts for said plurality of card holders; and
   (c) storing said financial card transaction data organized according to said card holder accounts for said plurality of card holders; and
   a reward computer for determining a reward for one of said plurality of card holders by:
   (d) receiving from said transaction data computer financial card transaction data for said card holder, said financial card transaction data related to transactions occurring during a transactional time period;
   (e) assigning each of said transactions to at least one of a plurality of transaction categories;
   (f) determining an expenditure level for said transactions in each of said plurality of transaction categories;
   (g) determining a transaction category having a highest expenditure level;
   (h) applying a high-level reward rate to expenditures in said transaction category having a highest expenditure level to determine a first reward amount;
   (i) applying a low-level reward rate to expenditures in at least one transaction category other than said transaction category having said highest expenditure level to determine a second reward amount; and
   (j) determining a total reward amount based on said first reward amount and said second reward amount.

2. The system of claim 1 wherein said low-level reward rate is applied to expenditures in all financial transaction categories other than said financial transaction category with said highest expenditure level.

3. The system of claim 1 wherein said low-level reward rate is applied to expenditures in said financial transaction category with said second highest expenditure level.

4. The system of claim 1 wherein said transactional time period is a plurality of billing cycles.

5. The system of claim 1 wherein said transactional time period is selected from the group consisting of a week, a month, a fiscal year, and a calendar year.

6. The system of claim 1 wherein said total reward amount is issued to said card holder in the form of a reward selected from the group consisting of a gift certificate, a rebate, cash, merchandise, or a coupon.

7. The system of claim 1 wherein said plurality of financial transaction categories are selected from the group consisting of travel, dining, groceries, electronics, entertainment, clothing, sporting goods, home maintenance, lawn and garden, appliances, pets, and automotive.

8. The system of claim 1 wherein said transactions are assigned to one of said plurality of financial transaction categories according to a transaction code.

9. The system of claim 1 wherein said sources are selected from the group consisting of traditional retailers, online retailers, entertainment establishments, and travel companies.

10. A computerized method for determining a reward for a card holder, comprising the computer implemented steps of:
   (a) setting a first reward rate and a second reward rate wherein said first reward rate is higher than said second reward rate;
   (b) defining a plurality of financial transaction categories;
   (c) entering in a computer said first and second reward rate and said plurality of financial transaction categories;
   (d) receiving at said computer a plurality of financial card transactions for said card holder wherein each transaction comprises a transaction expenditure;
   (e) executing at said computer instructions to:
      (1) assign each of said financial card transactions to at least one of said plurality of financial transaction categories;
      (2) determining a financial category having a largest total amount of transaction expenditures by calculating a total amount of transaction expenditures for said financial card transactions in each of said plurality of financial transaction categories and comparing said totals in each of said plurality of financial transaction categories;
      (3) apply said first reward rate to expenditures in said financial transaction category having said largest total amount of transaction expenditures; and
      (4) apply said second reward rate to expenditures in at least one financial transaction category other than said financial transaction category having said largest total amount of transaction expenditures.

11. The computerized method of claim 10 further comprising applying said first reward rate to expenditures in a financial transaction category with a second largest total amount of transaction expenditures.

12. The computerized method of claim 11 further comprising applying said first reward rate to expenditures in a financial transaction category with a third largest total amount of transaction expenditures.

13. The computerized method of claim 10 further comprising applying said second reward rate to all expenditures.

14. The computerized method of claim 10 wherein said financial card transactions are assigned to one of said plurality of financial transaction categories according to at least one transaction code in transaction data for said financial card transactions.

* * * * *